Sept. 19, 1944.　　　C. W. MOTT　　　2,358,528
PUMP
Filed May 18, 1942
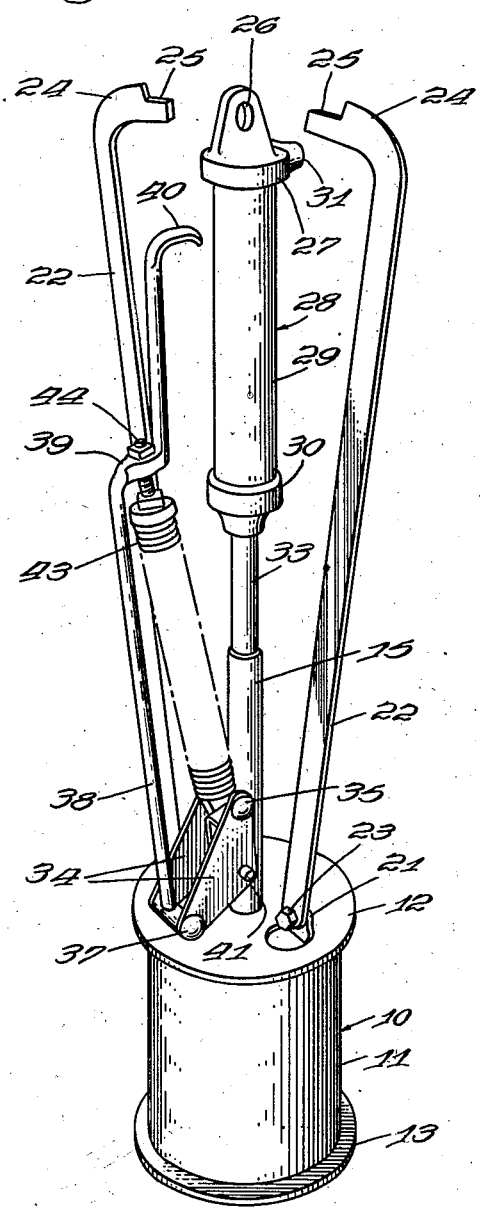
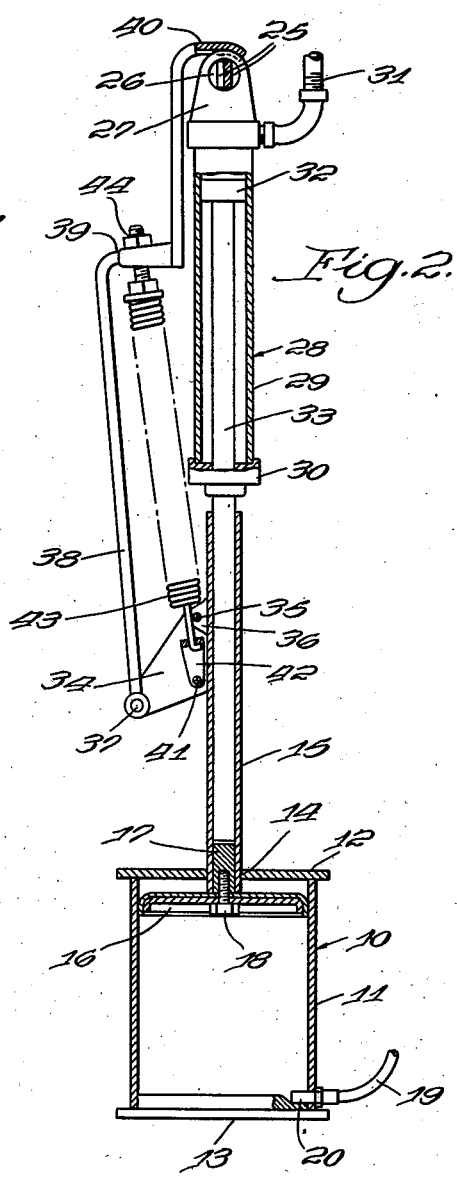
Inventor:
Carl W. Mott.
By Paul O Pippel
Atty.

Patented Sept. 19, 1944

2,358,528

UNITED STATES PATENT OFFICE 2,358,528

PUMP

Carl W. Mott, La Grange, Ill., assignor to International Harvester Company, a corporation of New Jersey Application May 18, 1942, Serial No. 443,345

8 Claims. (Cl. 230—52)

This invention relates to a pump and more particularly to a power-operated fluid pump.

The invention is concerned primarily with and has for its principal object the provision of an improved power-operated pump of the type adapted to inflate the pneumatic tires of vehicles and the like. In particular the invention aims to provide a pump adapted for use with pneumatic-tired agricultural implements and vehicles, wherein, in most cases, the agricultural implement, such as a tractor-mounted cultivator or the like, includes power lifting mechanism comprising a hydraulic cylinder. According to the present invention the improved air pump incorporates a frame structure, by means of which the hydraulic cylinder, when detached from the tractor, may be attached to the pump for operating the pump. The arrangement is such that the cylinder or other power device may be detached from the air pump and be used elsewhere.

The principal object of the invention is to provide an improved pump of the type and adapted for the purposes stated above.

An important object is to provide a frame or supporting structure, by means of which there may be attached to the air pump a power device, such as a hydraulic cylinder or the like.

And another object is to provide means enabling the quick and simple attachment of the cylinder to the pump, the means also enabling easy disassembly of the parts so that the cylinder or equivalent power device may be readily utilized elsewhere. Further objects and other important features of the invention will appear from the following detailed description of a preferred embodiment of the invention as illustrated in the accompanying sheet of drawings, in which:

Figure 1 is a perspective view of the improved pump shown in a state of partial disassembly; and Figure 2 is a transverse sectional view taken through the assembled pump.

As shown in the drawing, the preferred type of improved pump includes a first or lower cylinder 10 comprising a cylindrical housing 11 having upper and lower end walls 12 and 13. The upper wall is apertured as at 14 and receives a vertically extending tubular piston rod 15, the end of which inside the housing 11 is connected to a piston 16. The connection between the tubular member 15 and the piston 16 is preferably formed by means of a plug 17 rigidly fitted into the lower end of the member 15 and adapted to receive a bolt or cap screw 18 to hold the piston in place. The lower end of the cylinder 10 is provided with an air hose 19 appropriately attached to the cylinder and associated with a suitable check valve 20, the details of which form no part of the present invention and are therefore not illustrated.

As best shown in Figure 1, the upper wall 12 of the cylinder 10 is provided with a pair of upstanding ears 21 (only one of which is shown). Each ear has connected thereto an upwardly extending frame member or supporting element 22, the connection between the member 22 and the ear 21 being made by means of a bolt or pin 23 so that the connection provides a pivot on an axis transverse to the vertical axis of reciprocation of the piston 16. The upper end of each member 22 is bent or hooked as at 24, and the extremity of this portion is cut out to provide a reduced end portion 25. The frame structure thus takes the form of an inverted U or bail having its leg portions connected to or mounted on the cylinder 10 and having the hooked portions 24 adapted to be disposed together to provide the closed portion of the U or a bight in the bail.

As illustrated in Figure 2, the reduced portions 25 of the members 22 are adapted to be disposed in overlapping relation and assume this position in the assembling of the device, at which time these overlapping portions pass through an opening 26 formed in a cap or connecting portion 27 of a second or upper cylinder 28. This cylinder comprises a cylindrical housing 29 having opposite end walls, one of which is designated at 30 and the other or upper of which is formed as part of the connecting cap 27. The cylinder is preferably of the hydraulic type and is operated by the supply of fluid under pressure through an inlet line 31. A piston 32 is reciprocable in the cylinder and has connected thereto a piston rod 33. In the assembled device the rod 33 extends downwardly and fits telescopically into the tubular piston rod 15 of the lower cylinder 10. This arrangement provides a detachable connection between the two piston rods, and as previously stated, the disposition of the end portions 25 of the frame members 22 through the opening 26 in the upper end of the upper cylinder 28 provides a detachable connection between the U-shaped frame structure and the cylinder 28.

The cylinder 28 as illustrated is of the one way type; that is, inlet and outlet of fluid from the cylinder 29 occur through the line 31. Accordingly, it is desirable to have provided means for returning the piston to starting position preparatory to a second stroke. This means preferably takes the form of a spring-return device consisting of a pair of spaced plates 34 pivoted at 35 to an ear 36 on the tubular piston rod 15, these plates thus providing a link, at the other end of which is disposed a pivot pin 37, by means of which a connecting member 38 is attached to the link. This member extends upwardly and is offset intermediate its ends as at 39. The uppermost end of the member 38 is provided with a hook portion 40 which, as shown in Figure 1, is adapted to hook over the cap member 27 of the upper cylinder 28. The spaced plates 34 carry transversely thereof a third pin 41 to which is connected a U-shaped clip 42 which provides means for connecting of one end of a tension spring 43. The upper end of the spring is connected at 44 to the offset portion 39 of the member 38.

In the operation of the device as assembled (Figure 2), fluid is supplied through the line 31 to move the piston 43 downwardly in the cylinder 28. This movement is, of course, imparted to the piston 16 of the cylinder 10, and air under pressure is forced through the air hose 19. The cylinder 10 is of relatively large capacity, and the device accordingly provides a quick and efficient means for inflating pneumatic tires. It will be understood, of course, that the principles of the invention that have appeared from the foregoing description of the preferred embodiment thereof may be suitably adapted for use in other similar instances, and it is accordingly not intended to limit the invention by the detailed description of specific aspects of the invention.

As best illustrated in Figure 1, the cylinder 28 may be attached to or detached from the remaining structure by means of the novel arrangement of the frame members 22 and connecting member 38. The cylinder 28 is first arranged in position with the piston rod 33 telescopically fitting or connected to the tubular piston rod 15 of the lower cylinder 10. The frame or supporting members 22 may then be swung inwardly about their pivots 23 so that the reduced portions 25 of the members pass through and overlap within the opening 26 in the cap member 27 at the upper end of the cylinder 28. The connecting member 38 is then moved up against the tension of the spring 43, and the hook portion 40 is hooked over the upper end of the cap 27. With the parts in this position, the completed pump is ready for operation as described above. It is believed that the foregoing description will suffice to make apparent to those skilled in the art the numerous advantages and desirable features of the invention, it being understood, of course, that various modifications and alterations may be made in the preferred structure illustrated without departing from the spirit and scope of the invention as defined in the appended claims.

What is claimed is:

1. A fluid pump comprising a cylindrical fluid housing having opposite end walls, one wall being apertured on the axis of the cylinder; a U-shaped supporting frame having its legs connected to the housing and extending axially away from the apertured wall with the bight portion of the U spaced axially from said wall; a piston slidable axially in the housing; a tubular piston rod removably connected to the piston inside the housing and extending through the apertured end wall toward the bight of the U-frame; and a motor disposed between the supporting frame bight and the housing and including a fluid-receiving chamber with opposed wall parts forcibly separable by the introduction of fluid into such chamber, one of said parts being adjacently to said bight, the other of said parts having a rod extending oppositely from the one thereof toward said piston, said rod being disposed removably in said piston rod, and said parts being reactable outwardly on the bight and inwardly through said rods on the piston pursuant to the separation of said parts.

2. A fluid pump comprising a cylindrical fluid housing having opposite end walls, one wall being apertured on the axis of the cylinder; a U-shaped supporting frame having its legs connected to the housing and extending axially away from the apertured wall with the bight portion of the U spaced axially from said wall; said frame including a pair of complementary members having separable, overlapping portions at the bight of the U; a piston slidable axially in the housing; a tubular piston rod removably connected to the piston inside the housing and extending through the apertured wall toward the bight of the U-frame; and a motor disposed between the supporting frame bight and the housing and including a fluid-receiving chamber with opposed wall parts forcibly separable axially of the housing by the introduction of fluid into said chamber, one of said parts being adjacently to the frame bight and having means affording removable connection of the overlapping bight portions therewith, the other of said parts including a rod extension removably fitted with the piston rod for transmitting force to the piston pursuant to the forcible separation of said parts while the one thereof reacts against the frame bight.

3. A fluid pump comprising a cylindrical fluid housing having opposite end walls, one wall being apertured on the axis of the cylinder; a U-shaped supporting frame having its legs connected to the housing and extending axially away from the apertured wall with the bight portion of the U spaced axially from said wall; said frame including a pair of complementary members having separable, attaching portions at the bight of the U; a piston slidable in the housing; a piston rod connected to the piston and extending through the apertured wall toward the bight of the U-frame; and a motor disposed between the supporting frame bight and the housing and including a fluid-receiving chamber having opposed wall parts forcibly separable axially of the housing by fluid introduced into said chamber, one of said parts being adjacently to the frame bight and having a receiving section for the removable attachment of the bight portions therewith, and the other of said parts including a rod extension detachably assembled with the piston rod for transmitting force to the piston pursuant to the forcible separation of said parts while the one thereof reacts against the frame bight.

4. A fluid pump comprising a fluid housing having opposite end walls, one wall being apertured; a U-shaped supporting frame having its legs connected to the housing and extending away from the apertured wall with the bight portion of the U spaced from said wall; a piston slidable in the housing; a piston rod removably connected to the piston and extending through the apertured end wall toward the bight of the U-frame; and a motor disposed between the supporting frame bight and the housing and including a fluid-receiving chamber having opposed wall parts forcibly separable axially of the housing by fluid introduced into said chamber, one of said parts being adjacently to the frame bight for reaction thereagainst, and the other of said parts including a rod extension detachably assembled with the piston rod for transmitting force to the piston pursuant to the forcible separation of said parts while the one thereof reacts against the frame bight.

5. A fluid pump comprising a cylindrical fluid housing having opposite end walls, one wall being apertured on the axis of the cylinder; a U-shaped supporting frame having its legs connected to the housing and extending axially away from the apertured wall with the bight portion of the U spaced axially from said wall; said frame including a pair of complementary members having separable, overlapping portions at the bight of the U; a piston slidable axially in the housing; a tubular piston rod removably connected to the piston inside the housing and extending through the apertured wall toward the bight of the U-frame; and a fluid pressure device including a cylinder having a portion at one end formed with an opening removably engaging the overlapping portions of the members of the U-frame, and a piston including a piston rod telescopically fitting the aforesaid tubular piston rod and removably and operatively connected thereto.

6. A fluid pump comprising a cylindrical fluid housing having opposite end walls, one wall being apertured on the axis of the cylinder; a U-shaped supporting frame having its legs connected to the housing and extending axially away from the apertured wall with the bight portion of the U spaced axially from said wall; said frame including a pair of complementary members having separable, overlapping portions at the bight of the U; a piston slidable axially in the housing; a tubular piston rod removably connected to the piston inside the housing and extending through the apertured wall toward the bight of the U-frame; a fluid pressure device including a cylinder having a portion at one end formed with an opening removably engaging the overlapping portions of the members of the U-frame, and a piston including a piston rod removably and telescopically fitting the aforesaid tubular piston rod; and yieldable connecting means between the U-frame and the tubular piston rod.

7. A fluid pump comprising a cylindrical fluid housing having opposite end walls, one wall being apertured on the axis of the cylinder; a U-shaped supporting frame having its legs connected to the housing and extending axially away from the apertured wall with the bight portion of the U spaced axially from said wall; said frame including a pair of complementary members having separable, overlapping portions at the bight of the U; a piston slidable axially in the housing; a tubular piston rod removably connected to the piston inside the housing and extending through the apertured wall toward the bight of the U-frame; a fluid pressure device including a cylinder having a portion at one end formed with an opening removably engaging the overlapping portions of the members of the U-frame, and a piston including a piston rod removably and telescopically fitting the aforesaid tubular piston rod; and a connection between the U-frame and the tubular piston rod, comprising a link connected to the tubular piston rod, an arm connected at one end to the link and having its other end formed to engage the cylinder of the pressure device, and a tension spring connected between the arm and the tubular piston rod.

8. A fluid pump, comprising a lower, upright cylinder having a lower end wall and an apertured upper wall; a piston slidable in the cylinder and including a piston rod extending upwardly through the apertured wall; an upper cylinder arranged above and coaxially of the lower cylinder and including a downwardly extending piston rod; means detachably connecting the piston rods together; means for connecting the cylinders together, comprising a pair of parallel members including pivotal connections at their lower ends to the lower cylinder and extending upwardly at opposite sides of the second cylinder; and means detachably engageable between the upper ends of said members and the upper cylinder, said members being movable apart about their aforesaid pivotal connections for detachment from the upper cylinder.

CARL W. MOTT.